US010648199B2

(12) United States Patent
Moore (10) Patent No.: US 10,648,199 B2
(45) Date of Patent: *May 12, 2020

(54) ANIMAL RESISTANT LATCHING SYSTEM (71) Applicant: Compumeric Engineering, Inc., Ontario, CA (US)

(72) Inventor: David E. Moore, Temecula, CA (US)

(73) Assignee: COMPUMERIC ENGINEERING, INC., Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,164

(22) Filed: Jun. 5, 2015

(65) Prior Publication Data
US 2015/0345181 A1    Dec. 3, 2015

Related U.S. Application Data (63) Continuation of application No. 12/857,484, filed on Aug. 16, 2010, now Pat. No. 9,567,775, which is a
(Continued)

(51) Int. Cl.
*E05B 13/00* (2006.01)
*E05B 65/06* (2006.01)
(Continued)

(52) U.S. Cl.
CPC .............. *E05B 65/06* (2013.01); *A01K 29/00* (2013.01); *E05B 13/001* (2013.01); *E05C 9/043* (2013.01);
(Continued)

(58) Field of Classification Search
CPC ................................... E05C 9/04; E05B 13/00
(Continued)

(56) References Cited

U.S. PATENT DOCUMENTS 135,396 A    2/1873  Bishop
140,307 A    6/1873  Rand
(Continued)

FOREIGN PATENT DOCUMENTS

JP    02016275    1/1990
JP    06101378    4/1994

OTHER PUBLICATIONS

BearSaver RSO brochure, Sep. 2007, downloaded Dec. 14, 2009, from http://web.archive.org/web/20070920225648/www.bearsaver.com/pdf/RSO+Brochure.
(Continued)

*Primary Examiner* — Carlos Lugo
(74) *Attorney, Agent, or Firm* — Knobbe, Martens, Olson & Bear, LLP (57) ABSTRACT An animal-resistant latching system for inhibiting animals from accessing food and food containing refuse within containers is disclosed. The device is composed of an access panel containing an opening to which is secured at least one latching members, a cam assembly, a cover, and a bracket. The latching members are positioned so as to inhibit access to the container when the member is in the latched position and allow access to the container when the member is in the unlatched position. The cam assembly communicates with the latching members so as to move the members between the latched and unlatched positions. The cover and bracket are dimensioned and positioned on the access panel in a predetermined manner so as allow human hands access to the cam assembly and unlatch the container while simultaneously inhibiting such access by animals.

20 Claims, 6 Drawing Sheets

Related U.S. Application Data continuation of application No. 11/463,554, filed on Aug. 9, 2006, now Pat. No. 7,775,564.

(60) Provisional application No. 60/706,966, filed on Aug. 10, 2005.

(51) Int. Cl.
*A01K 29/00* (2006.01)
*E06B 7/28* (2006.01)
*E05C 9/04* (2006.01)

(52) U.S. Cl.
CPC ............... *E05C 9/048* (2013.01); *E06B 7/28* (2013.01); *E05B 13/00* (2013.01); *E05C 9/04* (2013.01); *Y10S 292/31* (2013.01); *Y10S 292/63* (2013.01); *Y10S 292/68* (2013.01); *Y10T 70/493* (2015.04); *Y10T 70/496* (2015.04); *Y10T 292/084* (2015.04); *Y10T 292/0834* (2015.04); *Y10T 292/0839* (2015.04); *Y10T 292/0841* (2015.04); *Y10T 292/0846* (2015.04)

(58) Field of Classification Search
USPC .......................................................... 292/37
See application file for complete search history.

(56) References Cited

U.S. PATENT DOCUMENTS

| | | | |
|---|---|---|---|
| 416,433 | A | 12/1889 | Wilson |
| 1,044,047 | A | 11/1912 | Hess |
| 1,447,462 | A | 3/1923 | Butscher et al. |
| 1,460,166 | A | 6/1923 | McArthur |
| 1,515,612 | A | 11/1924 | O'Connor |
| 1,865,205 | A | 6/1932 | Palmquist |
| 1,870,746 | A | 8/1932 | Edwards |
| 1,922,062 | A | 8/1933 | Sullivan |
| 2,075,495 | A | 3/1937 | Aten |
| 2,169,692 | A | 8/1939 | Hansen |
| 2,194,408 | A | 3/1940 | Sluss |
| 2,594,253 | A | 4/1952 | Vander Veer |
| 2,946,640 | A | 7/1960 | Sitler |
| 3,084,965 | A | 4/1963 | Carosello |
| 3,586,360 | A | 6/1971 | Perrotta |
| 3,953,061 | A | 4/1976 | Hansen et al. |
| 3,999,792 | A | 12/1976 | Smith |
| 4,046,412 | A | 9/1977 | Lee |
| 4,319,762 | A | 3/1982 | Streit et al. |
| 4,854,448 | A | 8/1989 | Hair, II |
| 5,029,909 | A | 7/1991 | Bunger |
| 5,092,143 | A | 3/1992 | Rumbles |
| D327,152 | S | 6/1992 | Rose et al. |
| 5,118,037 | A | 6/1992 | Ekegren |
| D328,659 | S | 8/1992 | Brenner et al. |
| D332,332 | S | 1/1993 | Markey |
| D333,541 | S | 2/1993 | Kropf |
| D345,239 | S | 3/1994 | Cooper |
| 5,341,752 | A | 8/1994 | Hambleton |
| 5,385,258 | A | 1/1995 | Sutherlin |
| D356,419 | S | 3/1995 | Kamm |
| 5,470,115 | A | 11/1995 | Berg et al. |
| 5,509,700 | A | 4/1996 | Kennedy, Jr. |
| 5,601,206 | A | 2/1997 | Haas et al. |
| D381,156 | S | 7/1997 | Kent |
| D389,631 | S | 1/1998 | Peters |
| 6,065,314 | A | 5/2000 | Nicholson |
| D446,373 | S | 8/2001 | Weiss et al. |
| 6,454,320 | B1 | 9/2002 | Weinerman et al. |
| 6,508,087 | B2 | 1/2003 | Lamley et al. |
| D480,854 | S | 10/2003 | Hardy et al. |
| 6,688,656 | B1 | 2/2004 | Becken |
| 6,771,183 | B2 | 8/2004 | Hunter |
| 6,783,162 | B1 | 8/2004 | Harper |
| D507,687 | S | 7/2005 | Moon et al. |
| 7,062,945 | B2 | 6/2006 | Saitoh et al. |
| D536,853 | S | 2/2007 | Presnell |
| D537,223 | S | 2/2007 | Lin |
| D537,596 | S | 2/2007 | Marshall |
| D538,995 | S | 3/2007 | Lin |
| D545,374 | S | 6/2007 | Gollob |
| 7,237,812 | B2 | 7/2007 | Tweedy |
| D558,421 | S | 12/2007 | DesLaurier |
| D558,947 | S | 1/2008 | Gardner et al. |
| D566,921 | S | 4/2008 | Skalka |
| D577,171 | S | 9/2008 | Moore |
| D587,874 | S | 3/2009 | Lin |
| D606,721 | S | 12/2009 | Moore |
| D612,560 | S | 3/2010 | Moore |
| D613,019 | S | 3/2010 | Moore |
| 7,681,752 | B2 | 3/2010 | Moore |
| 7,775,564 | B2 | 8/2010 | Moore |
| 2007/0046032 | A1 | 3/2007 | Moore |
| 2007/0084865 | A1 | 4/2007 | Moore |
| 2010/0181316 | A1 | 7/2010 | Moore |

OTHER PUBLICATIONS

BearSaver RSO Series, Webpage, Dec. 2006, downloaded Dec. 14, 2009 from http://web.archive.org/web/20070226081804/www.bearsaver.com/TrashAndRecycling.htm.

BearSaver Guardian Series Brochure, downloaded on Dec. 14, 2009, from: http://securr.com/pdf/SecurrBrochure_1-09.pdf.

ANIMAL RESISTANT LATCHING SYSTEM

CROSS-REFERENCE TO RELATED APPLICATIONS

This application is a continuation application of U.S. application Ser. No. 12/857,484 filed Aug. 16, 2010, entitled ANIMAL-RESISTANT LATCHING SYSTEM, which is a continuation application of U.S. application Ser. No. 11/463,554 filed Aug. 9, 2006, issued on Aug. 17, 2010 and U.S. Pat. No. 7,775,564, entitled ANIMAL-RESISTANT LATCHING SYSTEM which claims the benefit of priority under 35 U.S.C. § 119(e) of U.S. Provisional Application No. 60/706,966 filed on Aug. 10, 2005 by David Moore, entitled BEAR PROOF POCKET LATCH, the entirety of which is incorporated herein by reference.

BACKGROUND OF THE INVENTION

Field of the Invention

The present invention relates to latching systems and, in particular, concerns a latching system for use with a container to inhibit access to the interior of the container by animals.

Description of the Related Art

Food and food containing refuse generated by humans can attract the attention of animals in areas adjacent to animal habitats. Animals, such as bears, have a keen sense of smell and can easily detect food which is stored or discarded in containers left outdoors such as storage lockers and refuse bins on streets or in parks. Because these outdoor containers are accessible and plentiful, they are an attractive source of food for animals compared to foraging in their natural habitat. Furthermore, once animals learn that this source of food is available, they may lose their wariness towards humans and frequently return to areas where the food was located, increasing the probability of an animal-human encounter.

The attraction of animals, and bears in particular, to human populated areas is problematic. The size and strength of some animals, bears, for example, makes them a potential threat to people or property they encounter while attempting to access containers containing food. Further, animals entering settled areas can become injured or killed by moving automobiles, electrical lines, and other human technologies. Thus, to protect people, property, and the animals themselves, it is desirable to inhibit animals from accessing containers storing food and food containing refuse.

Latches are commonly placed on containers for this purpose. However, current latching mechanism designs are problematic. The latches can require significant strength or dexterity to operate, presenting difficulties for children, the elderly, or the handicapped. Further, these latching mechanisms may require a user to re-engage the latch after each use. Should the user forget to re-engage the latch, the receptacle is vulnerable to animals.

These deficiencies in current latch designs illustrate the need for improved animal-resistant latches which are easy to use and mechanically robust while reducing the potential for user error.

SUMMARY OF THE INVENTION

The aforementioned needs are satisfied by the animal-resistant latching system of the present invention which, in one aspect, comprises an access panel having a first and a second side, adapted to be moved between an open and a closed position with respect to the container. In this aspect, the latching system further comprises an opening formed between the first and second sides.

In one aspect, the preferred embodiments of the present invention provide an animal resistant latching system for use with a container to inhibit access to the interior of the container by animals, the latching system. The system comprises an access panel having a first and a second side and an opening formed between the first and second sides where the access panel is adapted to be moved between an open and a closed position with respect to the container. The system further comprises at least one latching member that is movable between a latched position and an unlatched position, where the at least one latching member is coupled to the access panel at a location and where the at least one latching member inhibits movement of the access panel to thereby inhibit access to the container in the latched position and where the at least one latching member permits movement of the access panel to thereby allow access to the container in the unlatched position. The system additionally comprises a cam assembly having a lever, where the cam assembly is mounted to a first side of the access panel and where the cam assembly is coupled to the at least one latching member such that movement of the cam assembly results in movement of the at least one latching member between the latched and unlatched positions and where the lever is positioned so as to be accessible through the opening in the cover so as to allow a person to move the cam assembly so as to urge the at least one latching member from the latched position to an unlatched position. The system also comprises a cover that is mounted on the second side of the access panel so as to cover the opening in the access panel, where the cover has side walls that extends outward from the plane of the second side of the access panel and an outer surface that interconnects the side walls so as to define a space positioned above the opening in the access panel where the cover defines a cover opening that permits access into the space defined by the cover and also to the lever of the cam assembly via the opening in the access panel where the cover opening is dimensioned so as to permit a human hand access to the lever via the opening in the access panel to manipulate the at least one latching member from the latched position to the unlatched position and is further dimensioned so as to inhibit an animal from accessing the lever to manipulate the at least one latching member from the latched position into the unlatched position. The system further comprises a bracket positioned on the second side of the access panel adjacent the cover opening, where the bracket extends outward from the second surface of the panel and where the bracket is spaced from the cover opening a distance that is selected to permit human access to the cover opening but inhibit access by animals.

In another aspect, the preferred embodiments of the present invention provide a bear resistant latching system for use with a container to inhibit access to the interior of the container by bears, the latching system. The system comprises an access panel having a first and a second side and an opening formed between the first and second sides, where the access panel is adapted to be moved between an open and a closed position with respect to the container. The system also comprises at least one latching member that is movable between a latched position and an unlatched position, where the at least one latching member is coupled to the access panel at a location and where the at least one latching member inhibits movement of the access panel to thereby inhibit access to the container in the latched position and where the at least one latching member permits movement of the access panel to thereby allow access to the container in the unlatched position. The system further comprises a rotatable cam assembly having a lever, where the rotatable cam assembly is mounted to a first side of the access panel and where the rotatable cam assembly is coupled to the at least one latching member such that rotation of the cam assembly results in movement of the at least one latching member between the latched and unlatched positions and where the lever is positioned so as to be accessible through the opening in the cover so as to allow a person to move the rotatable cam assembly so as to urge the at least one latching member from the latched position to an unlatched position. The system additionally comprises a cover that is mounted on the second side of the access panel so as to cover the opening in the access panel, where the cover has side walls that extends outward from the plane of the second side of the access panel and an outer surface that interconnects the side walls so as to define a space positioned above the opening in the access panel and where the cover defines a cover opening that permits access into the space defined by the cover and also to the lever of the rotatable cam assembly via the opening in the access panel and where the cover opening is dimensioned so as to permit a human hand access to the lever via the opening in the access panel to manipulate the at least one latching member from the latched position to the unlatched position and is further dimensioned so as to inhibit a bear from accessing the lever to manipulate the at least one latching member from the latched position into the unlatched position.

In a further aspect, the preferred embodiments of the present invention provide a bear resistant latching system for use with a container to inhibit access to the interior of the container by bears, the latching system. The system comprises a container defining an interior accessible through a container mouth possessing a plurality of edges bordered by a container mouth frame. The system also comprises an access panel comprising a first side, a second side, an access panel opening formed between the first and second sides, a reinforced edge at the periphery of the access panel, and a hinge, where the hinge interconnects the access panel to the container, allowing the access panel to pivot between an opened and closed position with respect to the container. The system additionally comprises at least one latching member, mounted to the first side of the access panel, adjacent to the reinforced edge, where the at least one latching member comprises a latch bolt which passes through a latch bolt housing and where the latch bolt is moveable between a latched position and an unlatched position where the latch bolt inhibits movement of the access panel to thereby inhibit access to the container in the latched position and where the at least one latching member permits movement of the access panel to thereby allow access to the container in the unlatched position. The system further comprises an actuator mounted to a first side of the access panel, where the actuator is coupled to the at least one latching member such that movement of the actuator results in movement of the at least one latching member between the latched and unlatched positions and where the actuator is positioned so as to be accessible through the opening in the cover so as to allow a person to move the actuator so as to urge the at least one latching member from the latched position to an unlatched position. The system also comprises a cover that is mounted on the second side of the access panel so as to cover the opening in the access panel, where the cover has side walls that extends outward from the plane of the second side of the access panel and an outer surface that interconnects the side walls so as to define a space positioned above the opening in the access panel and where the cover defines a cover opening that permits access into the space defined by the cover and also to the actuator via the opening in the access panel and where the cover opening is dimensioned so as to permit a human hand access to the actuator via the opening in the access panel to manipulate the at least one latching member from the latched position to the unlatched position and is further dimensioned so as to inhibit a bear from accessing the actuator to manipulate the at least one latching member from the latched position into the unlatched position.

BRIEF DESCRIPTION OF THE DRAWINGS

These and other objects and advantages will become more apparent from the following description taken in conjunction with the accompanying drawings.

DETAILED DESCRIPTION OF THE PREFERRED EMBODIMENT

Some embodiments of the present invention relate to an animal-resistant latch directed towards inhibiting the access of bears to food containing receptacles. However, the embodiments of the invention may be applied to inhibiting the access of animals in general to containers.

Figure 1A:
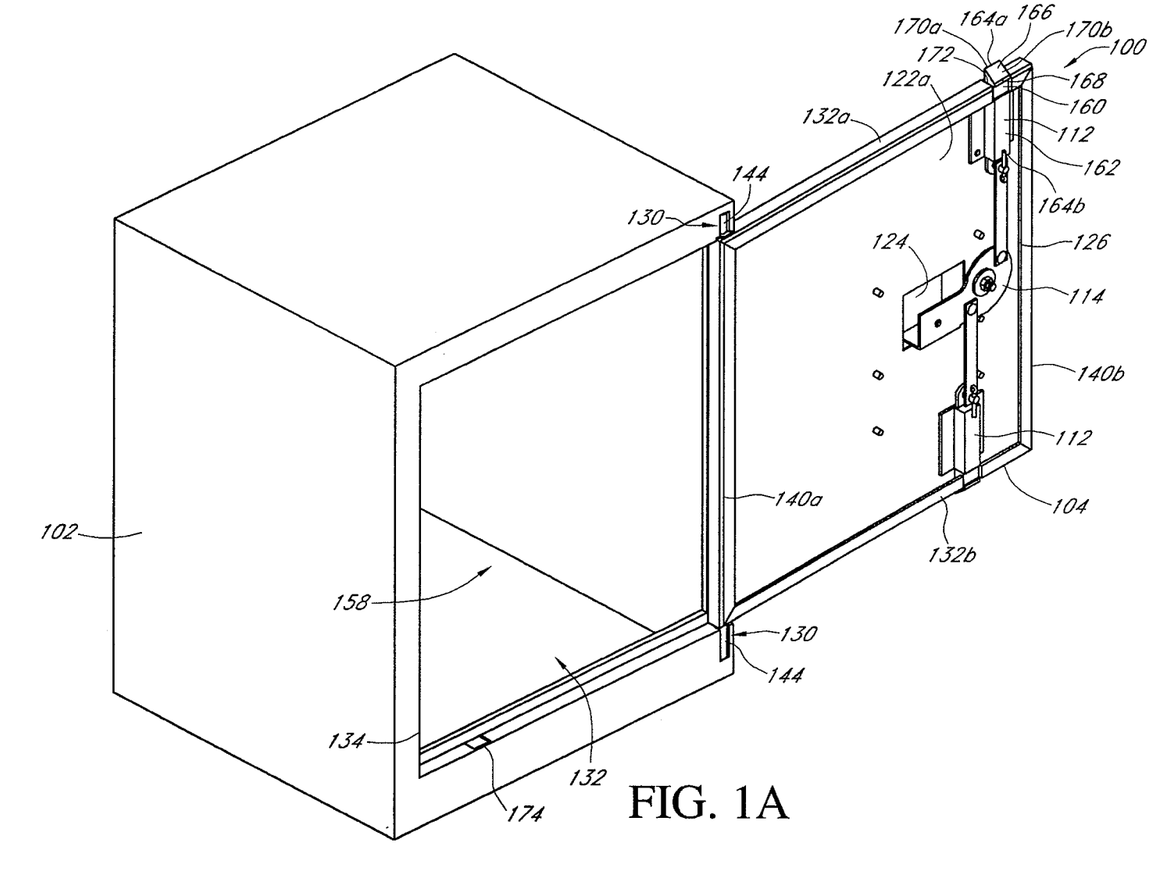
FIGS. 1A-1B illustrate perspective views of a container equipped with one embodiment of an animal resistant latching system in the opened and closed position.
Figure 1B:
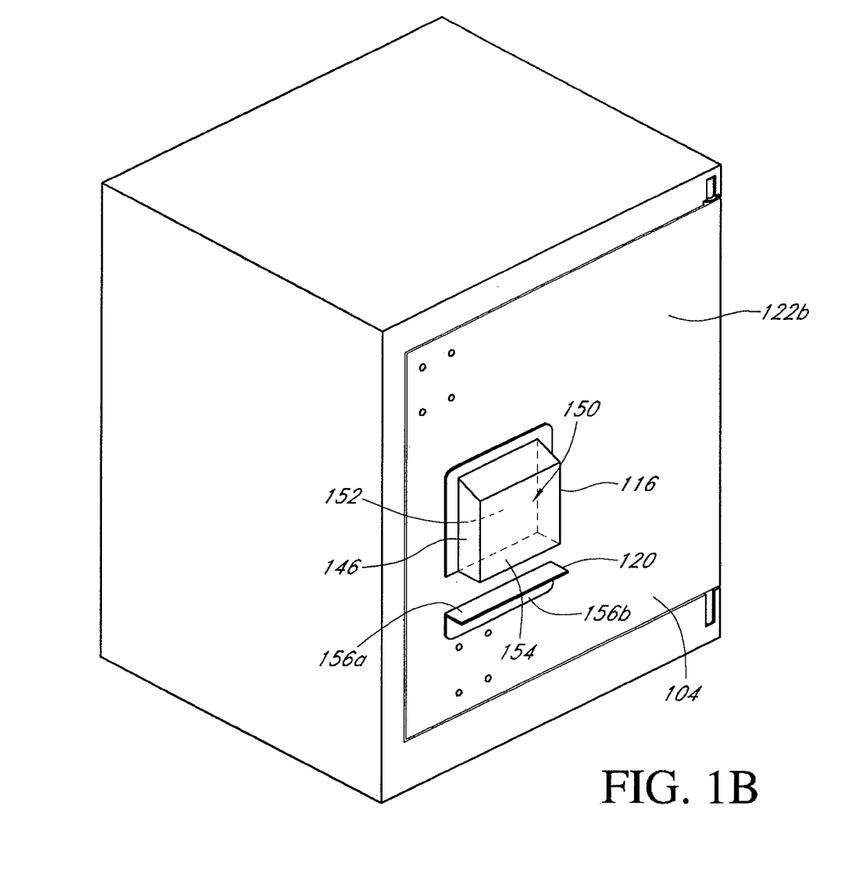

FIGS. 1A-1B illustrate a perspective view of one embodiment of an animal-resistant latching system 100 in open and closed positions. Generally, the system 100 is adaptable for use with a container 102 in order to inhibit an animal from accessing the contents of the container 102. Such containers may include, but are not limited to, campground food storage boxes and outdoor trash receptacles, including business and household receptacles. The latching system 100 includes an access panel 104, at least one latching member 112, an actuator 114, a cover 116, and a bracket 120.

As shown in FIG. 1A, the access panel 104 is comprised of a first side 122a, a second side 122b, an access panel opening 124, a reinforced edge 126, and a hinge 130. The reinforced edge 126 is formed from a plurality of bends at the periphery of the access panel 104, in a direction generally parallel to the plane of the first side 122a of the access panel. A first segment 132a of the reinforced edge 126 extends outward from the plane of the first side 122a of the access panel 104. A second segment 132b of the reinforced edge 126 extends outward from the first segment 132a towards the center of the access panel 104 in a direction generally parallel to the plane of the first side 122a of the access panel. As illustrated in FIG. 1B, the access panel 104 is preferably dimensioned to span a container mouth 134 such that the first segment 132a of the reinforced edge 126 of the access panel 104 lies substantially adjacent to a container mouth frame 134 when the access panel 104 is in the closed position. In the particular embodiment of FIGS. 1A-1B, the container mouth 132 and the access panel 104 are configured in a generally rectangular shape. However, the access panel 104 may be configured to span a container mouth 132 of arbitrary shape, such as a circle or oval.

The reinforcing edge 126 is designed to work in concert with a container 102 so as to inhibit an animal, such as a bear, from accessing the food container 102. The distance separating the first segment 132a of the reinforced edge 126 and the container mouth frame 134 when the access panel 104 is in the closed position is predetermined to be less than the width of an animal claw, such as that of a bear. Additionally, the length of the first segment 132a of the reinforced edge 126 is dimensioned so as to be longer than the length of an animal claw, such as that of a bear. Advantageously, this design inhibits an animal from inserting their claws between the reinforced edge 126 of the access panel 104 and the container mouth frame 136 in order to pry open the access panel 104 from the closed position. Furthermore, the reinforced edge 126 acts to strengthen the edges of the panel 104, further inhibiting an animal attempting to access the container 102 from substantially deforming the access panel 104.

The access panel opening 124 illustrated in FIGS. 1A-1B is also formed between the first and second sides 122a and 122b of the access panel 104. In the embodiment of FIGS. 1A-1B, the access panel opening 124 possesses a generally rectangular shape. Further, the opening 124 is sized so as allow access of at least a portion of a human hand through the access panel 104 to the actuator 114 as described in further detail with respect to FIG. 4.

FIG. 1A also illustrates the hinge 130. The hinge 130 is positioned at a first edge 140a of the access panel 104, allowing the access panel 104 to be moved between the open and closed positions. In the embodiment of FIG. 1, the hinge 130 comprises a hinge pin 144 configured to mount within the container mouth frame 134 in a manner allowing the access panel 104 pivot about the hinge pin 144. In this manner, the access panel 104 may be moved between the opened position to permit access to the container 102 and the closed position to inhibit access to the container 102. Advantageously, the hinge pin 144 of the hinge 130 is recessed within the container mouth frame 134, substantially protecting the hinge 130 from animal attack or environmental damage, enhancing the robustness of the latching system 100.

In the particular embodiment of FIGS. 1A-1B, the access panel 104 is mounted so as to cover the container mouth 134 which is positioned on the side of a container 102. In an alternative implementation, the access panel 104 may also be mounted on a container 102 possessing a top facing container mouth 134 to inhibit access to an animal.

FIG. 1B shows the second side 122b of the access panel 104, illustrating the cover 116 and bracket 120. The cover 116 comprises cover sidewalls 146 and an outer surface 150. The sidewalls 146 extend outward from the plane of the second side 122b of the access panel 104 and the outer surface 150 interconnects with the sidewalls 146 so as to define a space 152 positioned above the access panel opening 124. The cover 116 further defines a cover opening 154 that permits access to a space 152 defined by the cover 116 and also to the cam assembly 114. The bracket 120 comprises a first face 156a and a second face 156b. The second face 156a of the bracket 120 is interconnected to the second face 122b of the access panel 104 in a position such that the first face 156a of the bracket 120 faces opposite the cover opening 154. In one implementation, the cover 116 and bracket 120 are formed by stamping metal, such as steel, into the above-described shape. As will be described in greater detail below with respect to FIG. 4, the dimension and spacing of the cover 116 and bracket 120 are predetermined in order to allow access to the access panel opening 124 by a human hand but inhibit such access by the paw of an animal, such as a bear.

The animal resistant latching system 100 is latched and unlatched by use of the latching members 112 in conjunction with the actuator 114. One embodiment of the one latching members 112 is presented in FIG. 1A. As will be described in greater detail below, the latching members 112 are movable between a latched position, wherein the members 112 inhibit movement of the access panel 104 in order to deny access to a container interior 158, and an unlatched position, wherein the latching members 112 allow movement of the access panel 104 for access into the container interior 158. Beneficially, the latching members 112, in this embodiment, are configured to return to the latched position when the access panel 104 is closed in a manner to be discussed below in reference to FIG. 2. As a result, an individual who opens the access panel 104 does not need to manually re-engage the latching members 112 in the latched position upon closing the access panel 104, ensuring that the access panel 104 is latched when moved to the closed position.

Figure 2:
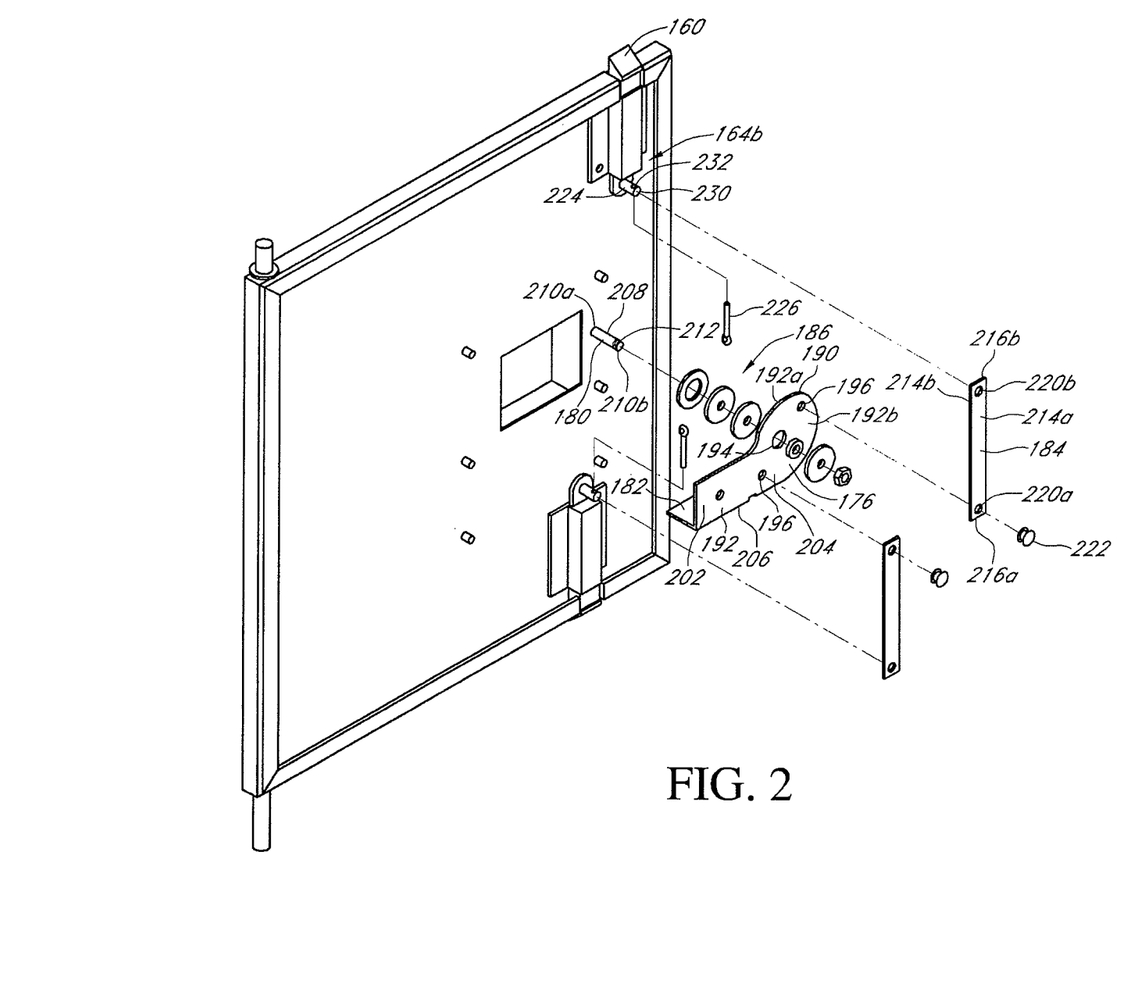
FIG. 2 is an exploded perspective view of the animal resistant latching system of FIG. 1.

As illustrated in FIGS. 1A and 2, the latching members 112 comprise a latch bolt 160 which passes through a generally elongated latch bolt housing 162 which is attached to the first side 122a of the access panel 104, adjacent to the reinforced edge 126. A first end 164a of the latch bolt 160 possesses a contour 166 which is tapered from a first face 170a of the latching member 112 to a second face 170b, ending in a flange 168. This tapered first end 164a of the latch bolt 160 facilitates the return of the latching members 112 to the latched position when the access panel 104 is closed in a manner that will be described below in reference to the cam assembly 114 of FIG. 2. A second end 164b of the latch bolt 160 is configured for attachment to the actuator 114 which moves the latching members 112 from the latched to unlatched position in a process also to be described in more detail with further reference to the cam assembly 114 in FIG. 2.

The latching members 112 are positioned on the first side 122a of the access panel 104, adjacent to the reinforced edge 126. The latch bolt housing 162 acts to guide the motion of the latch bolt 160, which extends outward from the latch bolt housing 162, substantially perpendicular to the reinforced edge 126 of the access panel 104 through a gap 172 in the reinforced edge 126. As illustrated in FIG. 1A, in the latched position, the latching members 112 extend beyond the reinforced edge 126 and engage striker plate holes 174 within the container mouth frame 134 when in the latched position, inhibiting movement of the access panel 104. In the unlatched position, the latching members 112 are retracted within the reinforced edge 126 of the access panel 104 so as to allow movement of the panel 104 within the container mouth frame 136.

More specifically, the latching members 112 are further positioned opposite the hinge 130 adjacent to a second edge 140b of the access panel 104. An opening force exerted at this location, approximately perpendicular to the plane of the access panel 104, results in a high torque with which to open the access panel 104. Therefore, placing the latching members 112 in this location inhibits this location from being used to apply the opening force. An opening force applied at an alternative location, closer to the hinge 130, will need to be greater than the force applied at the second edge 140b of the access panel 104 to generate the same torque. In this fashion, the access panel 104 is made more difficult to open when the latching members 112 are latched, enhancing the security provided by the animal resistant latching system 100.

In one aspect of the particular embodiment of the invention illustrated in FIGS. 1A-1B, two latching members 112 are utilized in the latching system 100 at lateral sides of the panel 104 adjacent the edge opposite the hinge 130. As the number of latching members 112 is increased, the opening force required to open the access panel 104 without unlatching the latching members 112 is increased. This design allows the construction of the latching system 100 to be varied depending on the nature of the animal threat. Fewer of the latching members 112 may be used in environments where the animals attempting to access the container 102 are relatively weak. More of the latching members 112 may be used in environments where the animals attempting to access the container 102 are relatively strong, such as bears.

Furthermore, incorporation of the two latching members 112 adjacent to the second edge 140b of the access panel 104 allows the latching members 112 to work in conjunction with the hinge 130 to enhance the security provided by the latching system 100. As illustrated in FIG. 1A, the latching members 112 and hinge 130 are located near the corners of the access panel 104. The hinge pin 144 is secured within the container mouth frame 134, while the latch bolts 160, when in the latched position, are secured within the striker plate holes 174 when the access panel 104 is in the closed position. Thus, the four corners of the access panel 104 are secured in place when the two latching members 112 are latched and the access panel 104 is in the closed position. Advantageously, in this secured state, none of the reinforced edges 126 of the access panel 104 are more vulnerable to forced opening by an animal than any other, enhancing the security of the latching system 100.

FIG. 2 illustrates an exploded view of the actuator 114 in communication with the latching members 112. In one embodiment, the actuator 114 may comprise a cam assembly 114. In a preferred embodiment, the actuator may comprise a rotatable cam assembly 114. As will be described in detail below, actuation of the rotatable cam assembly 114 retracts the latching members 112 to the unlatched position, allowing access into the container 102. Releasing the rotatable cam assembly 114 returns the rotatable cam assembly 114 and the latching members 112 back to their original, latched position. The rotatable cam assembly 114 comprises a rotatable cam body 176, a pivot pin 180, a lever 182, at least one cam arm 184, and a plurality of washers 186.

The rotatable cam body 176 comprises a planar, generally circular cam central body 190 possessing a first side 192a and a second side 192b. A pivot hole 194 and a plurality of cam body arm holes 196 are formed between the first and second sides 192a and 192b of the rotatable cam body 176. As discussed below in greater detail with respect to FIG. 2, the pivot hole 194 is roughly centered within the cam central body 190 to allow insertion of the pivot pin 180, while the plurality of cam body arm holes 196 are positioned about the pivot hole 194 at approximately 45 degrees with respect to the plane of the lever 182 in order to provide an attachment point for two cam arms 184. The cam central body 190 is interconnected to a generally rectangular cam body extension plate 202 at a cam body first end 204. The lever 182 is interconnected to a first edge 206 of the cam body extension plate 202 and extends outward from the first side 192a of the rotatable cam body 176 towards the opening 124 in the access panel 122. In one implementation, the rotatable cam body 176 is formed of stamped metal, such as steel.

The pivot pin 180 comprises a generally elongated, cylindrical pivot pin body 208 possessing a first end 210a and a second end 210b. The first end 210a of the pivot pin 180 is fixedly attached to the first side 122a of the access panel 104, whereby the pivot pin 180 extends outward from the plane of the access panel 104. The position of the pivot pin 180 is designed to orient the lever 182 at a predetermined position with respect to the access panel opening 124, as discussed in greater detail with respect to FIG. 4. The second end 210b of the pivot pin 180 possesses a cam body securing mechanism 212 for restraining the motion of the rotatable cam body 176, as discussed below.

The rotatable cam body 176 is mounted to the access panel 104 using the pivot pin 180. The second end 210b of the pivot pin 180 is inserted through the pivot hole 194 from the first side 192a of the rotatable cam body 176 and the rotatable cam body 176 is placed at rest on the pivot pin body 208. The plurality of washers 186 is interposed between the access panel 104 and the rotatable cam body 176, on the pivot pin 180, to position the lever 182 at a predetermined position with respect to the access panel opening 124, as discussed below in reference to FIG. 4. The rotatable cam body 176 is secured in place on the pivot pin 180 by the rotatable cam body securing mechanism 212 on the second end 210b of the pivot pin 180. The rotatable cam body securing mechanism 212 may include, but is not limited to, a thread and nut. In this manner, the rotatable cam body 176 is supported and allowed to pivot freely by the pivot pin body 208, while being restrained from removal from the pivot pin 180 once the rotatable cam body securing mechanism 212 is engaged.

The cam arms 184 connect the rotatable cam body 176 and the latching members 112. The cam arms 184 are generally rectangular, possessing a first side 214a and a second side 214b, a first end 216a and a second end 216b. The cam arms 184 are preferably dimensioned so as to span the distance between the latching members 112 and the rotatable cam body 176. A first and a second cam arm holes 220a and 220b are formed between the first and second sides 214a and 214b of the cam arms 184 at the first and second ends 216a and 216b, respectively. A rivet 222 is inserted within a first cam arm hole 220a at the first end 216a of the cam arms 184 and a cam body arm hole 196 to attach the retractable cam body 176 to the cam arms 184. As illustrated in the embodiment of FIG. 2, the second end 216b of the cam arms 184 is attached to the latch bolt 160 by a latch bolt pin 224. The latch bolt pin 224 is connected to the second end 164b of the latch bolt 160, extending outward from the plane of the latch bolt 160, and is inserted into the second cam arm hole 220b. A cam arm locking pin 226 is inserted into a first end 230 of the latch bolt pin 224 through a latch bolt pin hole 232. Both cam arms 184 are similarly attached to the rotatable cam body 176 in this fashion.

Figure 3A:
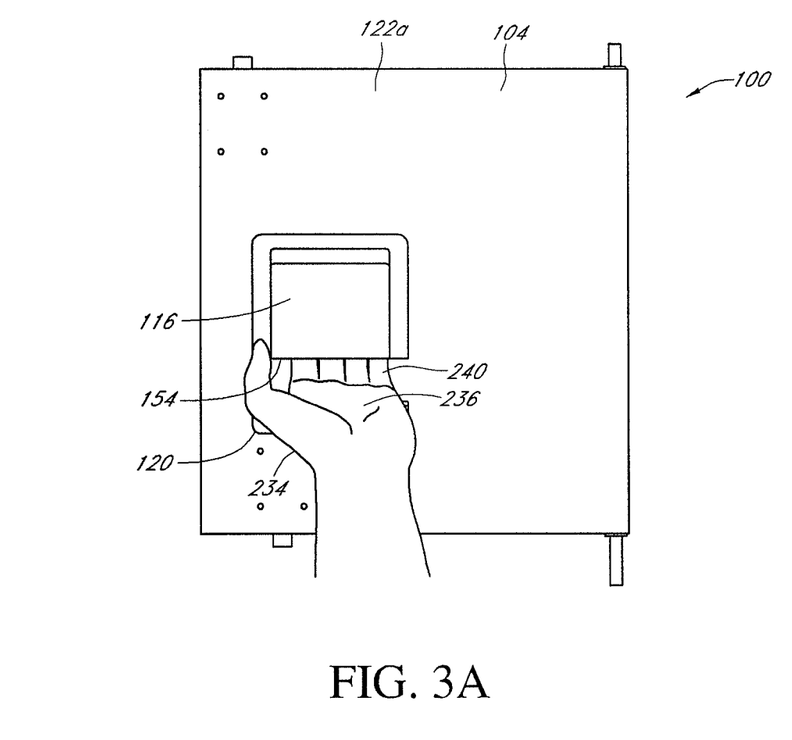
FIGS. 3A-3B illustrate front and rear views of the animal resistant latching system of FIG. 1 operated by a human hand.
Figure 3B:
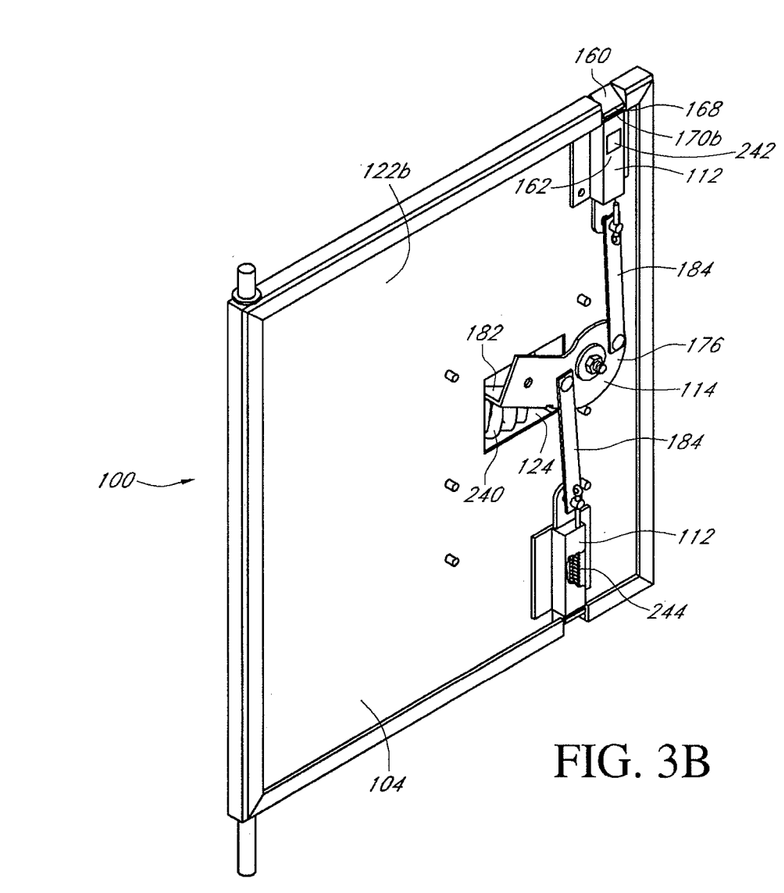

FIGS. 3A-3B illustrate the unlatching operation of the latching system 100, performed by a single human hand 234. As shown in FIG. 3A, the hand 234 is extended with a palm 236 facing the cover opening 154. Fingers 240 of the hand 234 are curled towards the cover opening 154 and inserted into the cover opening 154 until contact is made between the fingers 240 and the lever 182. As illustrated in FIG. 3B, an upward motion of the fingers 240 against the lever 182 causes the rotatable cam body 176 to rotate about the pivot pin 180. This rotation causes the rotatable cam body 176 to pull the cam arms 184 towards the rotatable cam body 176, which in turn retracts the latching members 112. The retraction at the latching members 112 continues in response to the upward motion applied to the lever 182 until the flange 168 on the second face 170b of the latch bolts 160 contact the latch bolt housing 162. In this position, the latching members 112 are in the unlatched position and the access panel 104 may be moved to the open position.

Once unlatched, the hand 234 moves access panel 104 to the opened position to gain access to the container interior 158. The hand 234 is removed from the cover opening 154 once the container 102 is opened. In one advantage, the latching members 112 may be unlatched with a single hand. In another advantage, attachment of the cam arms 184 to the cam central body 190 about the pivot hole 194 at an angle of approximately 45 degrees with respect to the plane of the lever 182 provides a large motion of the cam arms 184 for a comparatively small upward hand motion. These features enhance the ease of operation the rotatable cam assembly 114 and allow persons possessing reduced strength or dexterity to open the animal resistant latching system 100 and access the container interior 158.

In a further advantage, the animal resistant latching system 100 may be unlatched by people who become locked within the container 102 without assistance from the first side of the access panel 104. This functionality is achieved by exposing the lever 182 to the first side 122a of the access panel 104. In this manner, the lever 182 may be lifted from within the container interior 158 just as the lever 182 is lifted by users from outside the container 102 to unlatch the latching system 100 and open the access panel 104.

The rotatable cam assembly 114 is returned to its latched state by a biasing member 242 when the fingers 240 are removed from the lever 182. The biasing member 242, mounted within the latch bolt housing 162, acts to bias the latching member 112 in the latched position. In the embodiment of FIG. 2, the biasing member 242 comprises a spring 244 interconnecting the first and second ends 164a and 164b of the latch bolt 160. When latch bolt 160 is pulled away from the reinforced edge 126 of the access panel 104 during rotation of the rotatable cam assembly 114, the spring 244 is pulled from its rest position. Removal of the fingers 240 from the lever 182 removes the force pulling the spring 244 and allows the spring 244 to return to its rest position, returning the rotatable cam assembly 114 and the latch bolt 160 to their latched state. Advantageously, the latching members 112 return to their latched state without user intervention. In an alternative implementation, the biasing member 242 could comprise a torsional spring interconnected to the rotatable cam body 176 so as to induce or bias the cam body 176 into the latched position.

The latching members 112 further work in concert with the biasing members 242 to reengage the latch bolt 160 upon closure of the access panel 104 from the open position. As discussed above, when the access panel 104 is in the open position, without actuation of the rotatable cam assembly 114, the biasing members 242 urges the latching members 112 into the latched position. As the access panel 104 is moved from the open to closed position, the contour 166 at the first end 164a of the latch bolt 160 contacts the container mouth frame 136. As the access panel 104 is further moved into the closed position, the container mouth frame 136 presses against the contour 166 of the latch bolt 160, forcing the latch bolt 160 away from the container mouth 134. This movement of the latch bolt 160 allows the access panel 104 unimpeded motion towards the closed position. When the access panel 104 reaches the closed position, the first end 164a of the latch bolt 160 abuts the striker plate holes 174 (FIG. 1A) and the biasing member 242 returns the latch bolt 160 to the latched position. Beneficially, a user is not required to remember to re-latch the animal resistant latching system 100 upon closing the access panel 104, enhancing the security and ease of use of the latching system 100.

Figure 4:
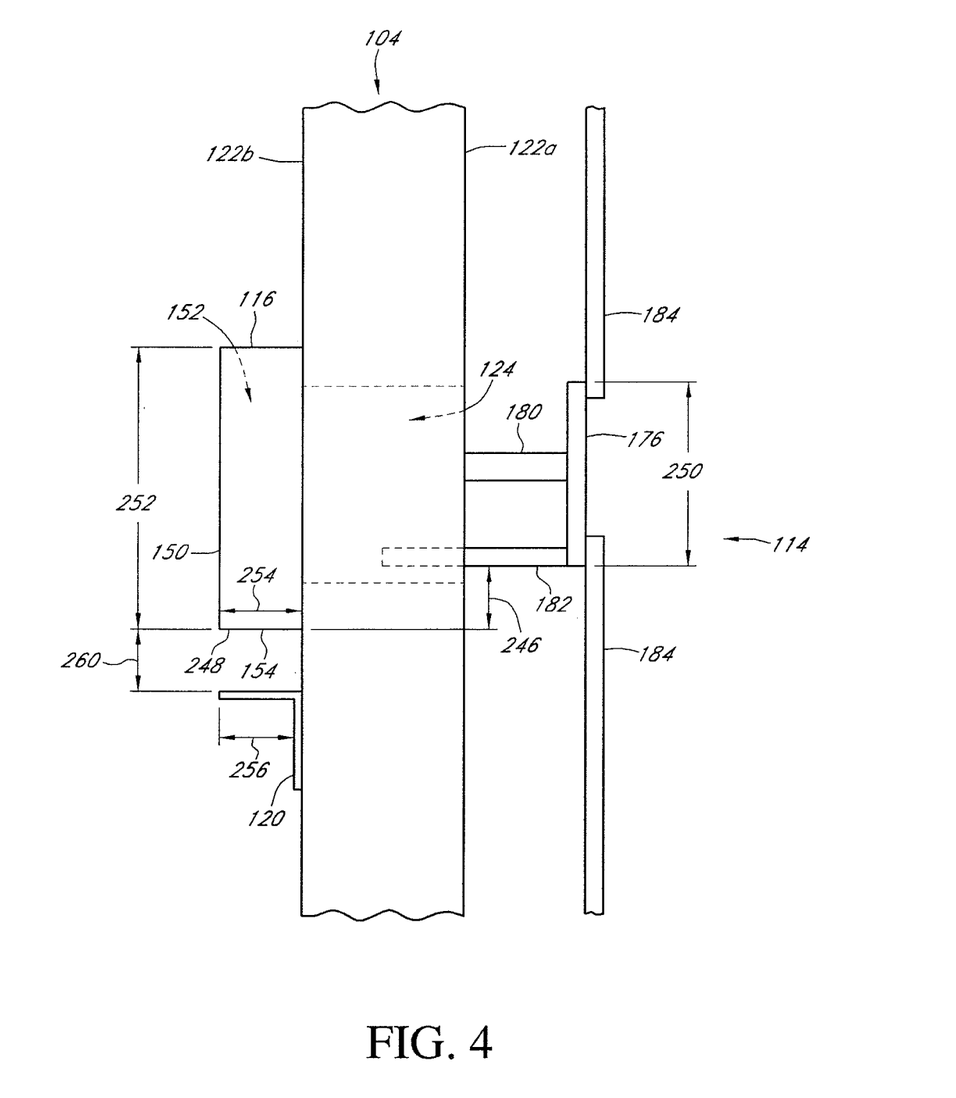
FIG. 4 presents a side view of the animal resistant latching system of FIG. 1, illustrating one embodiment of the predetermined dimensions of the latching system which inhibit access of the lever by bears.

The size and position of the cover 116, bracket 120, as well as the actuation of the rotatable cam body 176, in the particular implementation of FIG. 3 are predetermined on the basis of human and animal physiology. These parameters, illustrated in FIG. 4, are selected so as to allow access to and actuation of the cam assembly 114 by human hands but inhibit such access and actuation by the claws of animals. The parameters discussed below in respect to FIG. 4 are, in particular, designed to inhibit the access of bears to the container 102. However, alternative embodiments of the latching system 100 may utilize alternative parameters, selected to specifically inhibit the access of other animals to the container 102.

The cover 116 is present over the access panel 104 and serves as a first protective mechanism to inhibit access to the rotatable cam assembly 114 by animals such as bears. The cover 116 extends over the access panel opening 124 by a predetermined cover depth 252 sufficient to protect the rotatable cam assembly 114 through the lever actuation distance 250, as described below. In the embodiment of FIG. 4, the cover depth 252 is approximately 2.75 inches. The cover 116 also extends outward from second side 122b of the access panel 104 by predetermined cover opening height 254 which is designed to inhibit animals such as bears, in particular, large bears, from accessing the rotatable cam assembly 114 through the cover opening 154. This distance is selected to be less than the width of a typical large bear's claw but greater than the width of a typical human finger. In this manner, large bears are rendered physically unable to access the cam assembly 114, while humans may easily access the cam assembly 114. In one embodiment, the cover opening height 154 is approximately 1 inch.

A second protection mechanism may be provided by use of the bracket 120. Bears, particularly large bears, are incapable of bending their claws past a critical angle. By placing a bracket 120 having a predetermined bracket height 256 adjacent to the cover opening 154 at a predetermined bracket offset 260, hands or claws are be forced to bend a predetermined access angle to access the cam assembly 114 through the cover opening 154. Selecting the bracket height 256 and bracket offset 260 so that the resulting access angle is greater than the critical angle a large bear may bend their claws but smaller than the critical angle a human may bend their fingers, the large bear is inhibited from inserting their claws within the cover opening 154, while humans may easily insert their hands though the cover opening 154. In one embodiment of the latching system 100, the bracket height 256 is approximately 1 inch, while the bracket offset 260 is approximately 1.5 inches.

The rotatable cam assembly 114 is also designed to inhibit bears from actuating the lever 182 of the cam assembly 114 through the access panel opening 124 but allowing humans to easily actuate the cam assembly 114. This design is accomplished, in one part, by positioning the pivot pin 180 such that so that when the rotatable cam assembly 114 is mounted, the rest position of the lever 182 is recessed from the cover opening 154 by a predetermined lever offset distance 246 This design is accomplished, in a second part, by configuring the rotatable cam assembly 114 such that the lever 182 must be moved through at least a predetermined lever actuation distance 250 in order to move the latching members 112 from the latched to the unlatched position. The distances 246 and 250 are selected to be easily traversed by human hands but unachievable by bears, in particular, small bears. In the embodiment of FIG. 4, the lever offset distance 246 is approximately 0.5 inches, while the lever actuation distance 250 is at least 2.25 inches.

From the foregoing, it will be appreciated that the animal resistant latching system disclosed herein provides enhanced protection from large animals. The securing system utilizes a multi-point coupling system to keep the access panel closed. Further, the edges of the access panel are designed to inhibit animals from positioning a claw behind the edge and bending the access panel. Moreover, the latching system itself is designed to allow access to humans with flexible hands but inhibit access to animals with rigid claws.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. An animal resistant latching system for use with a container to inhibit access to the interior of the container by animals, the latching system comprising:
   an access panel having a first and a second side and an opening formed between the first and second sides wherein the access panel is adapted to be moved between an open and a closed position with respect to the container;
   at least one latching member that is movable between a latched position and an unlatched position wherein the at least one latching member is coupled to the access panel at a location wherein the at least one latching member inhibits movement of the access panel to thereby inhibit access to the container in the latched position and wherein the at least one latching member permits movement of the access panel to thereby allow access to the container in the unlatched position;
   a cam assembly having a lever wherein the cam assembly is mounted to a first side of the access panel and wherein the cam assembly is coupled to the at least one latching member such that movement of the cam assembly results in movement of the at least one latching member between the latched and unlatched positions and wherein the lever is positioned adjacent the opening in the access panel and is accessible so as to allow a person to move the cam assembly so as to urge the at least one latching member from the latched position to an unlatched position;
   a cover that is mounted on the second side of the access panel so as to cover the opening in the access panel wherein the cover has side walls that extends outward from the plane of the second side of the access panel and an outer surface that interconnects the side walls so as to define a space positioned above the opening in the access panel wherein the cover defines a cover opening that permits access into the space defined by the cover and also to the lever of the cam assembly wherein the cover opening is dimensioned to allow access to the lever via the opening in the access panel to manipulate the at least one latching member from the latched position to the unlatched position; and
   a bracket positioned on the second side of the access panel adjacent the cover opening wherein the bracket extends outward from the second surface of the panel and wherein the bracket is spaced from the cover opening.

2. The system of claim 1, wherein the at least one latching member comprises a first and a second latching member positioned on opposite lateral sides of the access panel.

3. The system of claim 1, wherein the at least one latching member is biased towards the latched position such that upon closing of the access panel, the at least one latching member is urged into the latched position.

4. The system of claim 3, wherein the cam assembly is a rotatable cam assembly and biases the at least one latching member into the latched position.

5. The system of claim 3, wherein the at least one latching member includes a spring which biases the at least one latching member into the latched position.

6. The system of claim 3, wherein the at least one latching member is contoured so as to permit closing of the access panel when the at least one latching member is in the latched position such that upon closing, the at least one latching member is urged again into the latched position.

7. The system of claim 1, wherein a plurality of edges of the access panel are reinforced so as to inhibit forceful opening of the access panel.

8. The system of claim 1, wherein a hinge of the access panel is recessed within the container so as to protect the hinge from damage.

9. The system of claim 1, wherein the cover opening height is approximately 1 inch, wherein the bracket extends outward from the second side of the access panel a bracket height distance of approximately 1 inch, and wherein the bracket is spaced from the cover opening a bracket offset distance of approximately 1.5 inches.

10. The system of claim 1, wherein the lever actuation distance comprises at least approximately 2.25 inches wherein the lever is recessed at least approximately 0.5 inches from the cover opening in the latched position and wherein the cover has a cover depth of at least approximately 2.75 inches.

11. An animal resistant latching system for use with a container to inhibit access to the interior of the container by animals, the latching system comprising:
    an access panel having a first and a second side and an opening formed between the first and second sides wherein the access panel is adapted to be moved between an open and a closed position with respect to the container;
    at least one latching member that is movable between a latched position and an unlatched position wherein the at least one latching member is coupled to the access panel at a location wherein the at least one latching member inhibits movement of the access panel to thereby inhibit access to the container in the latched position and wherein the at least one latching member permits movement of the access panel to thereby allow access to the container in the unlatched position;
    a cam assembly having a lever wherein the cam assembly is mounted to a first side of the access panel and wherein the cam assembly is coupled to the at least one latching member such that movement of the cam assembly results in movement of the at least one latching member between the latched and unlatched positions and wherein the lever is positioned adjacent the opening in the access panel and is accessible so as to allow a person to move the cam assembly so as to urge the at least one latching member from the latched position to an unlatched position;
    a cover that is mounted on the second side of the access panel so as to cover the opening in the access panel wherein the cover has side walls that extends outward from the plane of the second side of the access panel and an outer surface that interconnects the side walls so as to define a space positioned above the opening in the access panel wherein the cover defines a cover opening having a first height above the plane of the second side of the access panel that permits access into the space defined by the cover and also to the lever of the cam assembly to permit movement of the cam assembly via the opening in the access panel wherein the cover opening is dimensioned so as to allow access to the lever in the access panel to manipulate the at least one latching member from the latched position to the unlatched position; and a bracket positioned on the second side of the access panel adjacent the cover opening wherein the bracket extends outward from pane of the second surface of the panel a distance substantially equal to the first height of the cover opening and wherein the bracket is spaced from the cover opening.

12. The system of claim 11, wherein the at least one latching member comprises a first and a second latching member positioned on opposite lateral sides of the access panel.

13. The system of claim 11, wherein the at least one latching member is biased towards the latched position such that upon closing of the access panel, the at least one latching member is urged into the latched position.

14. The system of claim 13, wherein the cam assembly is a rotatable cam assembly and biases the at least one latching member into the latched position.

15. The system of claim 13, wherein the at least one latching member includes a spring which biases the at least one latching member into the latched position.

16. The system of claim 13, wherein the at least one latching member is contoured so as to permit closing of the access panel when the at least one latching member is in the latched position such that upon closing, the at least one latching member is urged again into the latched position.

17. The system of claim 11, wherein a plurality of edges of the access panel are reinforced so as to inhibit forceful opening of the access panel.

18. The system of claim 11, wherein a hinge of the access panel is recessed within the container so as to protect the hinge from damage.

19. The system of claim 11, wherein the cover opening height is approximately 1 inch, wherein the bracket extends outward from the second side of the access panel a bracket height distance of approximately 1 inch, and wherein the bracket is spaced from the cover opening a bracket offset distance of approximately 1.5 inches.

20. The system of claim 11, wherein the lever actuation distance comprises at least approximately 2.25 inches wherein the lever is recessed at least approximately 0.5 inches from the cover opening in the latched position and wherein the cover has a cover depth of at least approximately 2.75 inches.

* * * * *